US012703438B2

(12) United States Patent
Eakmbe et al.

(10) Patent No.: US 12,703,438 B2
(45) Date of Patent: Aug. 11, 2026

(54) VEHICLE WITH A GAP BETWEEN THE CHASSIS AND THE CAB CLOSED BY A SEALING DEVICE

(71) Applicant: Volvo Truck Corporation, Gothenburg (SE)

(72) Inventors: Gangaram Baliram Eakmbe, Maharashtra (IN); Akansha Vohra, Uttarakhand (IN)

(73) Assignee: Volvo Truck Corporation, Gothenburg (SE)

( * ) Notice: Subject to any disclaimer, the term of this patent is extended or adjusted under 35 U.S.C. 154(b) by 345 days.

(21) Appl. No.: 18/529,021

(22) Filed: Dec. 5, 2023

(65) Prior Publication Data

US 2024/0190520 A1 Jun. 13, 2024

(30) Foreign Application Priority Data

Dec. 12, 2022 (EP) .................................... 22212886

(51) Int. Cl.
*B62D 35/00* (2006.01)
*B62D 33/067* (2006.01)

(52) U.S. Cl.
CPC ......... *B62D 35/001* (2013.01); *B62D 33/067* (2013.01)

(58) Field of Classification Search
CPC ............................ B62D 35/001; B62D 33/067
See application file for complete search history.

(56) References Cited

U.S. PATENT DOCUMENTS 4,290,639 A * 9/1981 Herpel ................. B62D 35/001 296/180.3
8,196,993 B2 * 6/2012 Smith .................. B62D 35/001 296/180.3
10,737,734 B2 * 8/2020 Tenstam ............... B62D 35/001
2024/0253437 A1 * 8/2024 Eakmbe ................... B60J 10/21

FOREIGN PATENT DOCUMENTS

AT 509705 A4 11/2011
CN 114044057 A 2/2022
DE 4341693 A1 7/1994
JP H01226454 A 9/1989
JP 2003220900 A 8/2003
WO 2013191616 A1 12/2013

OTHER PUBLICATIONS

European Search Report for European Patent Application No. 22212886.0, completed May 4, 2023, 2 pages.

* cited by examiner

*Primary Examiner* — Faye M Fleming
(74) *Attorney, Agent, or Firm* — Withrow & Terranova, PLLC

(57) ABSTRACT

The vehicle comprises a chassis that includes at least one chassis front panel, and a driving cab mounted on the chassis by a suspension allowing the driving cab to move at least vertically relative to the chassis when the vehicle is driven on-road, the driving cab comprising, for the chassis front panel, a cab front panel disposed above and in vertical alignment with the chassis front panel, while being separated from the chassis front panel by a gap permitting relative movement between the chassis front panel and the cab front panel at least vertically. For the gap, the vehicle comprises a sealing device for closing the gap, sealing device comprising a bracket attached to the corresponding cab front panel, and a flap tiltably mounted on the bracket (Continued)

and which extends from the bracket towards the corresponding chassis front panel across the gap.

9 Claims, 6 Drawing Sheets

VEHICLE WITH A GAP BETWEEN THE CHASSIS AND THE CAB CLOSED BY A SEALING DEVICE

PRIORITY APPLICATIONS

The present application claims priority to European Patent Application No. 22212886.0, filed on Dec. 12, 2022, and entitled "VEHICLE WITH A GAP BETWEEN THE CHASSIS AND THE CAB CLOSED BY A SEALING DEVICE," which is incorporated herein by reference in its entirety.

TECHNICAL FIELD

The disclosure relates generally to a vehicle. In particular aspects, the disclosure relates to a vehicle with a gap between the chassis and the cab closed by a sealing device.

The disclosure can be applied in heavy-duty vehicles, such as trucks, buses, and construction equipment. Although the disclosure may be described with respect to a particular vehicle, the disclosure is not restricted to any particular vehicle.

BACKGROUND

Of particular interest here are vehicles in which a driving cab is mounted on a chassis by a suspension that allows the driving cab to move at least vertically relative to the chassis when the vehicle is driven on-road. To this end, a gap separates each front panel of the chassis from a front panel of the cab, disposed above and in vertical alignment with the chassis front panel, this gap being sized to allow relative movement between the chassis front panel and the cab front panel at least vertically. This gap is also used to allow the cab to tilt forward when the vehicle is not in use, typically to access the vehicle engine.

However, the presence of this gap at the front of the vehicle leads to problems in using the vehicle. Indeed, soiling tends to accumulate inside or near the gap, which can degrade the external cleanliness of the driving cab, in particular at its lateral sides, especially at the doors leading into the driving cab. In addition, the gap disturbs the airflow at the front of the vehicle as it moves, particularly at the front left and right corners of the vehicle. This impairs the aerodynamic performance of the vehicle, which results in higher fuel consumption.

SUMMARY

According to an aspect of the disclosure, a vehicle comprises:

- a chassis, which at the front of the vehicle comprises at least one chassis front panel,
- a driving cab, which is arranged at the front of the vehicle and which is mounted on the chassis by a suspension allowing the driving cab to move at least vertically relative to the chassis when the vehicle is driven on-road, the driving cab comprising, for the or each chassis front panel, a cab front panel which is disposed above and in vertical alignment with the chassis front panel, while being separated from the chassis front panel by a gap permitting relative movement between the chassis front panel and the cab front panel at least vertically, and
- for the or each gap, a sealing device for closing the gap, the sealing device comprising:
  - a bracket which is attached to the corresponding cab front panel, and
  - a flap, which is tiltably mounted on the bracket and which extends from the bracket towards the corresponding chassis front panel across the gap, the sealing device being adapted to maintain the flap in contact with the corresponding chassis front panel.

This aspect of the disclosure may seek to provide with a solution that addresses the above issues, while being practical, economical and reliable. A technical benefit may include closing the or each gap separating the chassis and cab front panels from each other with a dedicated sealing device which comprises a flap extending across the gap in an adjustable manner to accommodate relative movement between the chassis and cab front panels at least vertically. The positional adjustment of the flap of the or each sealing device results both from the flap being tiltably mounted relative to the corresponding cab front panel, more specifically tiltably mounted on a bracket of the sealing device, fixedly attached to the cab front panel, and from the flap being maintained in contact with the corresponding chassis front panel when the vehicle is driven on-road. Thus, when the vehicle is driven on-road and the chassis and cab front panels move relative to each other, in particular vertically due to the relief of the road on which the vehicle is driving, the flap is driven together with the chassis front panel relative to the cab front panel, by tilting the flap, while remaining across the gap between the chassis and cab front panels in order to ensure the sealing of this gap. As a result, the aerodynamic and cleanliness performance of the vehicle is significantly improved since the air and soiling that is applied to the front of the vehicle while driving on-road does not penetrate deeply into the gap between the chassis and cab front panels.

In some examples, the or each sealing device comprises at least one resilient member, which is mounted on the bracket and which acts on the flap so as, by tilting the flap relative to the bracket, to maintain the flap in contact with the corresponding chassis front panel. A technical benefit may include making the sealing device(s) reliable and simple to implement.

In some examples, the at least one resilient member comprises a torsion spring. A technical benefit may include making the implementation of the corresponding solution very simple and practical.

In some examples, a plurality of resilient members are provided and are regularly distributed on the bracket. A technical benefit may include making the sealing device(s) reliable and efficient.

In some examples, the driving cab is mounted on the chassis tiltably between a non-tilted position, in which the vehicle is drivable on-road, and a tilted position, in which the vehicle is not in use, and the or each sealing device is designed not to interfere with the chassis when the driving cab is tilted between the non-tilted and tilted positions. A technical benefit may be that the sealing device(s) does/do not impede the tilting of the cab.

In some examples, the or each sealing device, the bracket includes a stopper, which does not interfere with the flap when the vehicle is driven on-road, but against which the flap is maintained in abutment downwardly when the driving cab is tilted between the non-tilted and tilted positions. A technical benefit may include making the implementation of the corresponding solution very simple and practical.

In some examples, the or each sealing device, the flap includes: (i) a first end portion, which is turned towards the corresponding cab front panel and cooperates in a form-fitting manner with a flange of the bracket to guide the flap in tilting relative to the bracket, and (ii) a second end portion, which is opposite to the first end portion and which is adapted to cooperate by sliding contact with the corresponding chassis front panel when the vehicle is driven on-road. A technical benefit may include making the sealing device(s) reliable and simple to implement.

In some examples, the or each sealing device, the first end portion of the flap cooperates in a form-fitting manner with the flange of the bracket to also retain the flap horizontally relative to the bracket. A technical benefit may include stabilizing the mounting of the flap on the bracket.

In some examples, for the or each sealing device: (i) the corresponding gap is arranged at one of the front corners, respectively left and right, of the vehicle, (ii) the corresponding chassis front panel and cab front panel are respectively corner panels, and (iii) the bracket and the flap are shaped curved along an angled profile of the corner panels. A technical benefit may include making possible to arrange the sealing device(s) at crucial emplacement(s) of the vehicle.

In some examples, two sealing devices are provided and are respectively arranged at the two front corners, respectively left and right, of the vehicle. A technical benefit may include arranging the sealing devices at crucial emplacements of the vehicle.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILEDDESCRIPTION

Aspects set forth below represent the necessary information to enable those skilled in the art to practice the disclosure.

Figure 1:
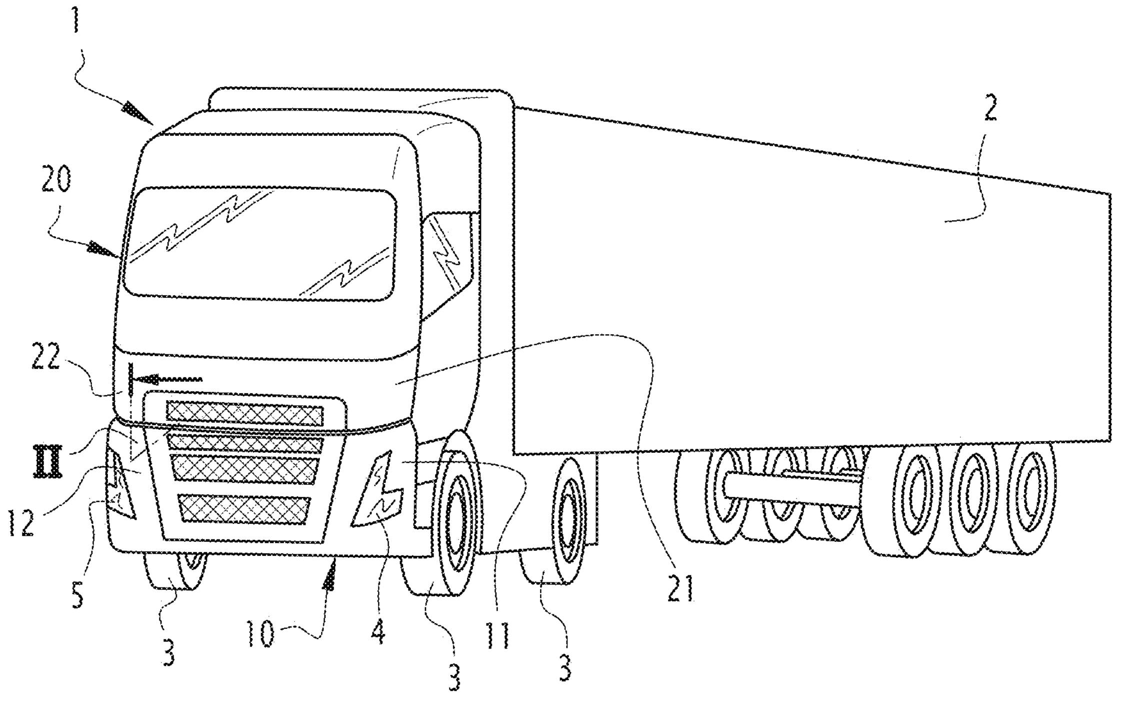
FIG. 1 is a perspective view of a vehicle according to an example.

FIG. 1 shows a truck 1.

The remainder of the description is oriented by considering that the term "vertical" refers to a direction that is perpendicular to the ground on which the truck 1 rests in normal use, this direction thus being directed either downward, i.e., toward the ground, or upward, i.e., away from the ground. The term "horizontal" refers to a direction that is parallel to the ground and therefore perpendicular to the vertical direction. The term "front" or similar refers to the orientation of a horizontal direction, directed in the direction of forward travel of the truck 1 over the ground, while the term "rear" or similar refers to the orientation of a horizontal direction, directed in the opposite direction to the front direction. The terms "left" and "right" are defined with reference to the left and right lateral sides, respectively, of the truck 1 considered in the front direction.

Figure 2:
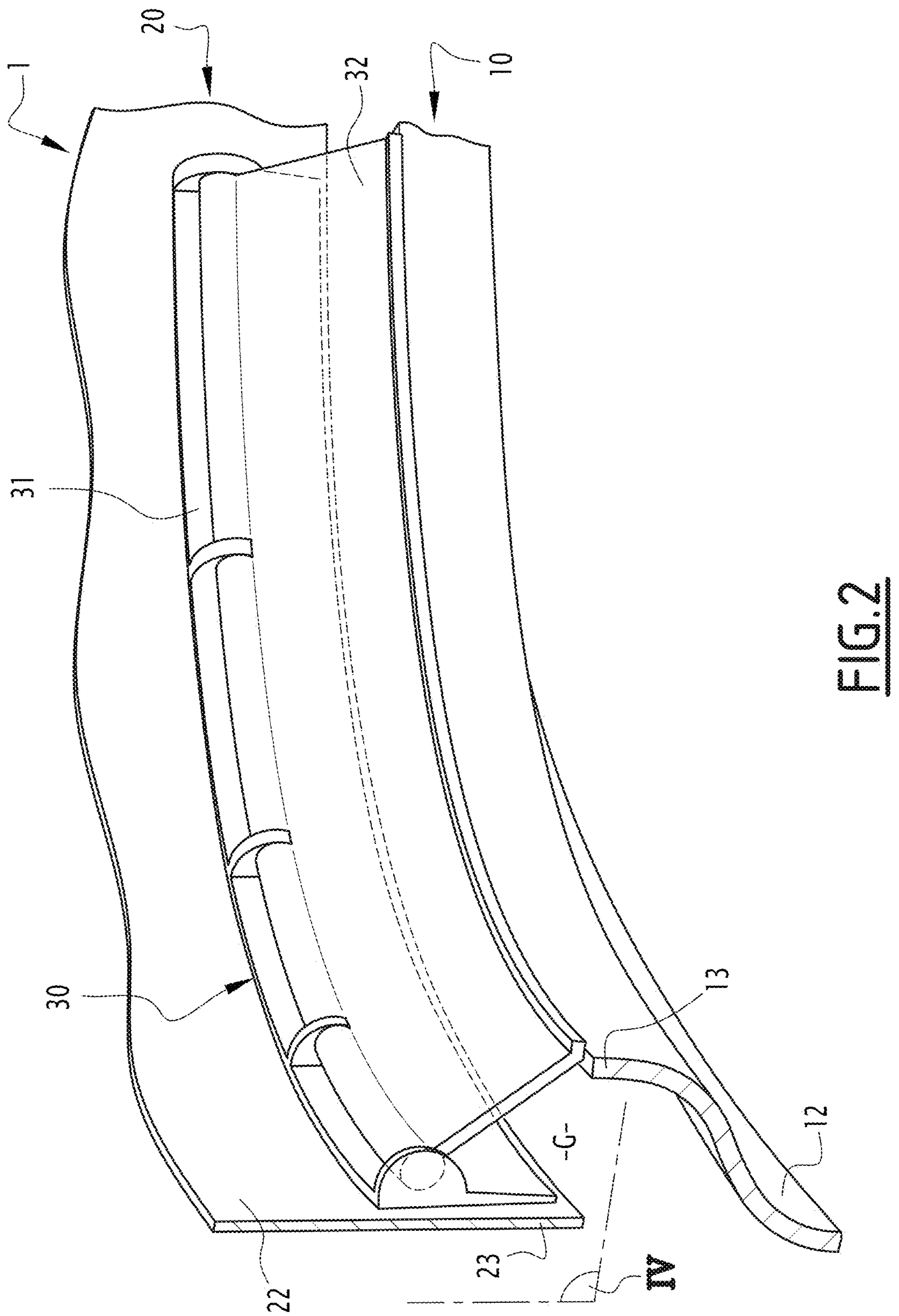
FIG. 2 is a perspective view, with a partial cross-section along plane II of FIG. 1, showing a sealing device within the vehicle.

As shown in FIGS. 1 and 2, the truck 1 comprises a chassis 10, which, by definition, supports the other components of the truck 1. In the example shown in FIG. 1, the truck 1 tows a trailer 2, but this aspect is not limiting. Also according to a non-limiting aspect, the chassis 10 rests on the ground by means of wheels 3 or, more generally, by means of ground translation members, which are driven in rotation by an engine of the truck 1 for moving the latter on the ground.

The chassis 10 includes one or more chassis front panels at the front of the truck 1, which separate an internal volume of the chassis from the exterior of the truck 1. This internal volume of the chassis 10 accommodates, among other things, the aforementioned engine, as well as, for example, headlights and other components of the truck 1. In the example considered in the figures, two such chassis front panels are considered, namely a chassis front panel 11, which is arranged at the left front corner of the truck 1, and a chassis front panel 12, which is arranged at the right front corner of the truck 1. Thus, here, the chassis front panels 11 and 12 are respectively corner panels which have, in horizontal cross-section, a rearward angled profile. The chassis front panels 11 and 12 thus extend from the front face of the truck 1 to, respectively, the left side face and the right side face of the truck 1. In the example shown in the figures, the chassis front panel 11 carries a left headlight 4 of the truck 1 and the chassis front panel 12 carries a right headlight 5 of the truck 1, with the respective glasses of the headlights 4 and 5 located on the front face of the chassis front panels 11 and 12.

As shown in FIG. 2, the right chassis front panel 12 has an upper edge 13, which, as in this case, may be slightly offset, towards the interior of the truck 1 with respect to the rest of the right chassis front panel 12. The same is true for the left chassis front panel 11.

Also as shown in FIGS. 1 and 2, the truck 1 further comprises a driving cab 20, which is arranged at the front of the truck 1. The driving cab 20 defines an internal volume, in which a driver of the truck 1 stands in order to drive the truck and in which are therefore arranged various control elements on which the driver acts, such as a steering wheel.

The driving cab 20 is mounted on the chassis 10 by a suspension that allows the driving cab 20 to move relative to the chassis 10 when the truck 1 is driven on-road. The corresponding displacement of the driving cab 20 is at least vertical, typically when the truck 1 is driven over road features, such as holes or speed bumps. The corresponding displacement of the driving cab 20 may also be horizontal, typically when the truck 1 is braking or accelerating. Of course, the amplitude of the corresponding displacement of the driving cab 20 remains limited, being defined by the damping capacities of the aforementioned suspension. The maximum amplitude of this displacement can be of the order of ten centimeters, for example.

Furthermore, the driving cab 20 can also be mounted on the chassis 10 in a tilting manner between a non-tilted position, which is illustrated in FIGS. 1 and 2, and a tilted position, which is not illustrated in the figures and which can be reached by the driving cab 10 by means of its tilting forward with respect to the chassis 10 from its non-tilted position about a horizontal axis perpendicular to the forward direction, with a tilting angle that can be several tens of degrees. In the non-tilted position of the driving cab 20, the truck 1 is drivable on-road by the driver in the driving cab 20, as described above. In the tilted position of the driving cab 20, the truck 1 is not in use, in particular not usable for driving. In the tilted position of the driving cab 20, the driving cab 20 may in particular make the aforementioned engine of the truck 1 accessible, typically for maintenance or repair purposes.

Figure 4:
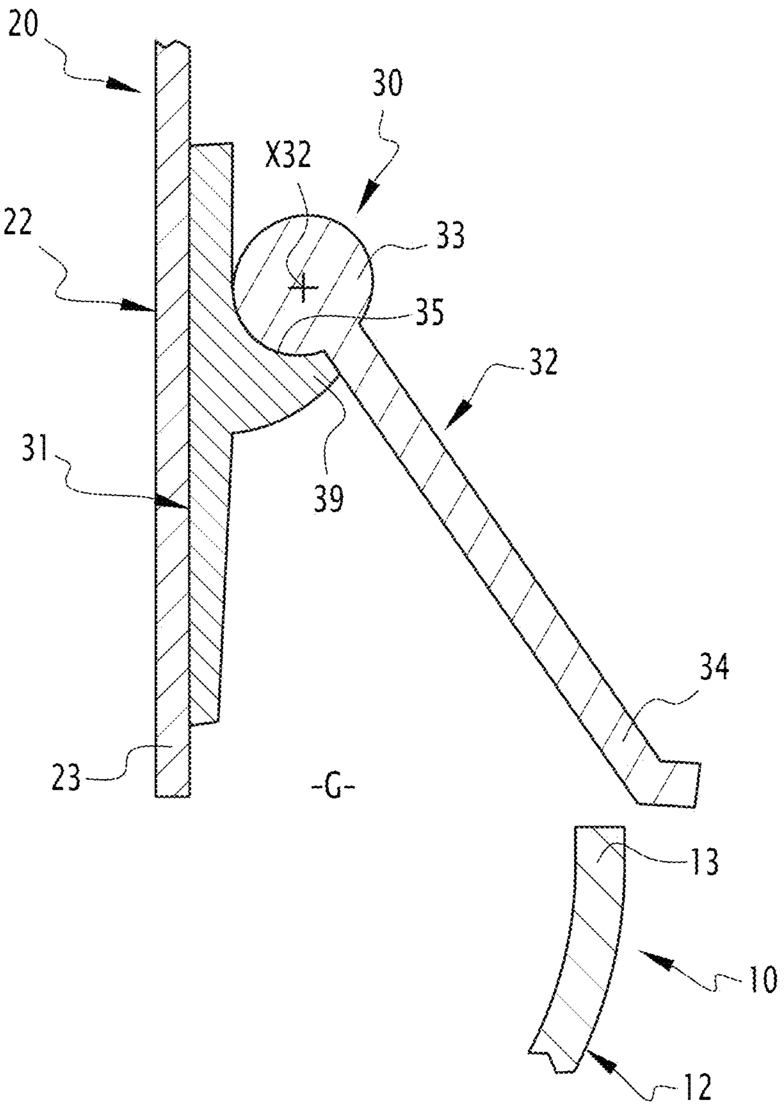
FIG. 4 is a schematic cross-section along plane IV of FIG. 2.
Figure 5:
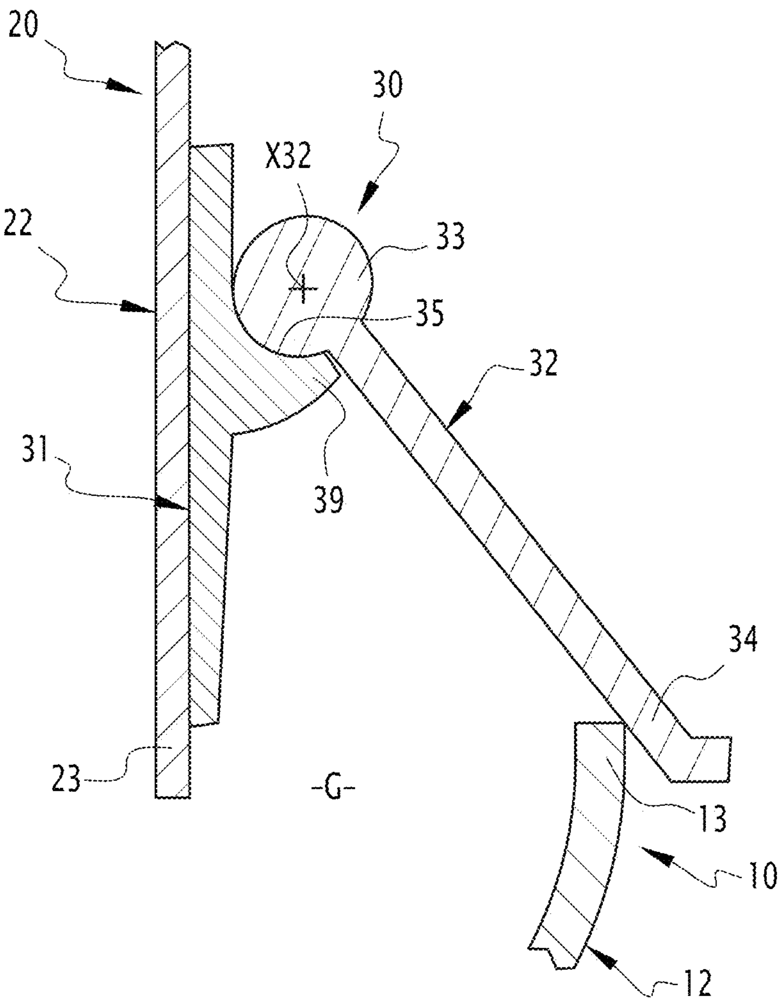
FIGS. 5 and 6 are similar views to FIG. 4, respectively illustrating two different use configurations than the one shown in FIG. 4.
Figure 6:
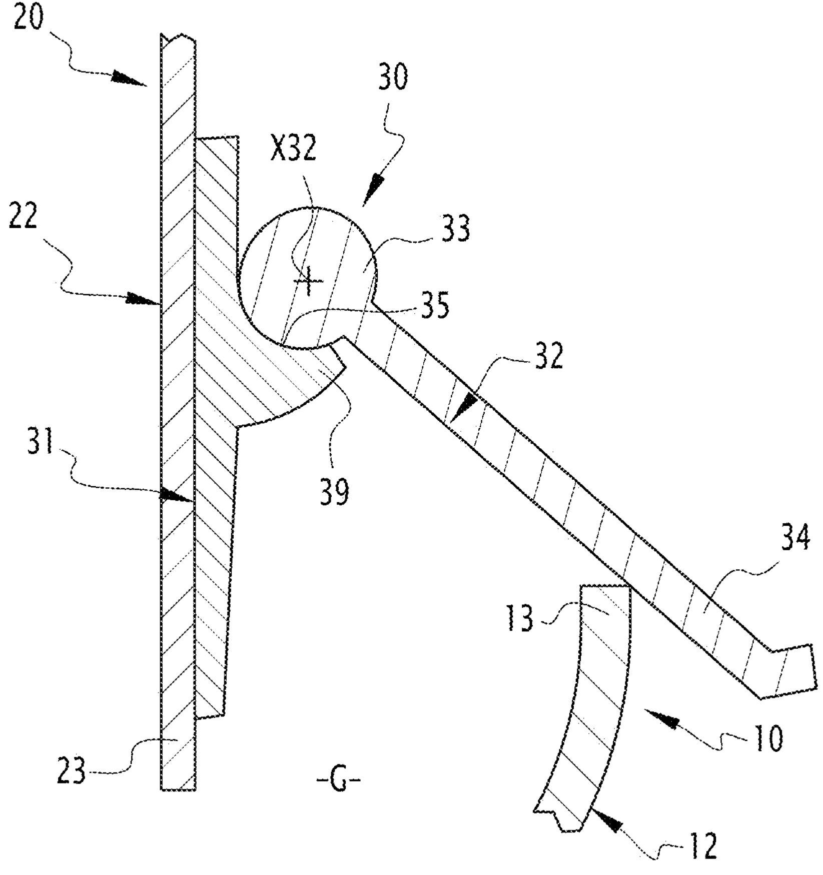

FIGS. 4 through 6 illustrate a movement that the suspension of the truck 1 allows between its chassis 10 and its driving cab 20. In FIG. 4, the driving cab 20 is in a non-tilted position, but without a driver on board. Thus, in FIG. 4, the truck 1 is not in use and its driving cab 20 occupies a nominal vertical position relative to the chassis 10. In FIGS. 5 and 6, the driving cab 20 remains in a non-tilted position and accommodates the driver on board to allow driving of the truck 1 on-road: in FIG. 5, the truck 1 is shown stationary or running at a constant speed on a horizontal, featureless road, while in FIG. 6, the truck 1 is shown while driving over a bump in the road. Thus, in FIGS. 5 and 6, the truck 1 is driven on-road but the driving cab 20 occupies a vertical position relative to the chassis 10, which in FIG. 5 is lower than the nominal vertical position of FIG. 4, and which in FIG. 6 is closer to the chassis 10 than in FIG. 5.

As shown in FIGS. 1 and 2, the driving cab 20 includes, for each of the chassis front panels 11 and 12, a cab front panel 21, 22, which is arranged above and in vertical alignment with the corresponding chassis front panel, as long as the driving cab 20 is in its non-tilted position. The cab front panels 21 and 22 separate the aforementioned internal volume of the driving cab 20 from the exterior of the truck 1. Here, the cab front panel 21 is arranged at the left front corner of the truck 1 and is a corner panel having, in horizontal section, an angled profile similar to that of the chassis front panel 11, while the cab front panel 22 is arranged at the right front corner of the truck 1 and is a corner panel having, in horizontal section, an angled profile similar to that of the chassis front panel 12. In a similar manner to the chassis front panels 11 and 12, the cab front panels 21 and 22 thus extend from the front face of the truck 1 to, respectively, the left and right side faces of the truck 1.

As can be seen in FIG. 2, the chassis front panel 12 and the cab front panel 22 are separated from each other by a gap G allowing a relative displacement between these two front panels 12 and 22, this displacement being at least vertically and possibly horizontally. The gap G thus allows the chassis front panel 12 and the cab front panel 22 not to interfere with each other when the driving cab 20 moves relative to the chassis 10 due to the suspension between them. The gap G may also allow the chassis front panel 12 and the cab front panel 22 not to interfere with each other when the driving cab 20 is tilted relative to the chassis 10 between its non-tilted and tilted positions.

Here, the gap G is arranged at the right front corner of the truck 1. Further, in the example shown in the figures, the gap G is at least partially defined between the upper edge 13 of the chassis front panel 12 and a lower edge 23 of the cab front panel 22. Here, the lower edge 23 is in vertical extension of the rest of the cab front panel 22, as well as in vertical extension of the chassis front panel 12, except for the upper edge 13 of the latter which is slightly offset towards the interior of the truck 1 with respect to the lower edge 23 when the driving cab 20 is in its non-tilted position.

As a result, when the truck 1 is driven on-road, in particular when the driving cab 20 moves relative to the chassis 10 due to the suspension therebetween, the upper edge 13 and the lower edge 23 may be found to be substantially horizontally aligned, as in the use configurations illustrated in FIGS. 5 and 6: in this case, the vertical overlap of the edges 13 and 23 with respect to each other may be variable, as shown by the comparison between FIGS. 5 and 6; similarly, the horizontal spacing between the edges 13 and 23 may also be variable. Similarly, when the driving cab 20 is tilted from its non-tilted position to its tilted position, the lower edge 23 becomes inclined above the upper edge 13, without interfering with the latter.

It will be noted that the chassis front panel 11 and the cab front panel 21 are separated from each other by a gap, which is functionally similar to the gap G described above, but which relates to these left front panels 11 and 21. In addition, what has just been described with respect to the lower edge 23 of the cab front panel 22 may apply to the cab front panel 21.

The truck 1 further comprises sealing devices to close the gap G between the chassis front panel 12 and the cab front panel 22 and the gap between the chassis front panel 11 and the cab front panel 21 respectively. The sealing device for closing the gap G is shown in FIGS. 2 to 6, where it is referenced 30, this sealing device 30 being shown alone and at rest in FIG. 3. The second sealing device belonging to the truck 1, i.e. the sealing device for closing the gap between the chassis front panel 11 and the cab front panel 21, is not visible in the figures, but is similar to the sealing device 30. This second sealing device may be symmetrical to the sealing device 30 with respect to a median vertical plane of the truck 1. Thus, in the following, the sealing device 30 will be described in detail, it being understood that the second sealing device of the truck 1 can be deduced from the description of the sealing device 30, in particular by symmetry with respect to the median vertical plane of the truck 1.

Here, the sealing device 30 is arranged at the right front corner of the truck 1, while the second sealing device belonging to the truck 1 is arranged at the left front corner of the truck 1.

Figure 3:
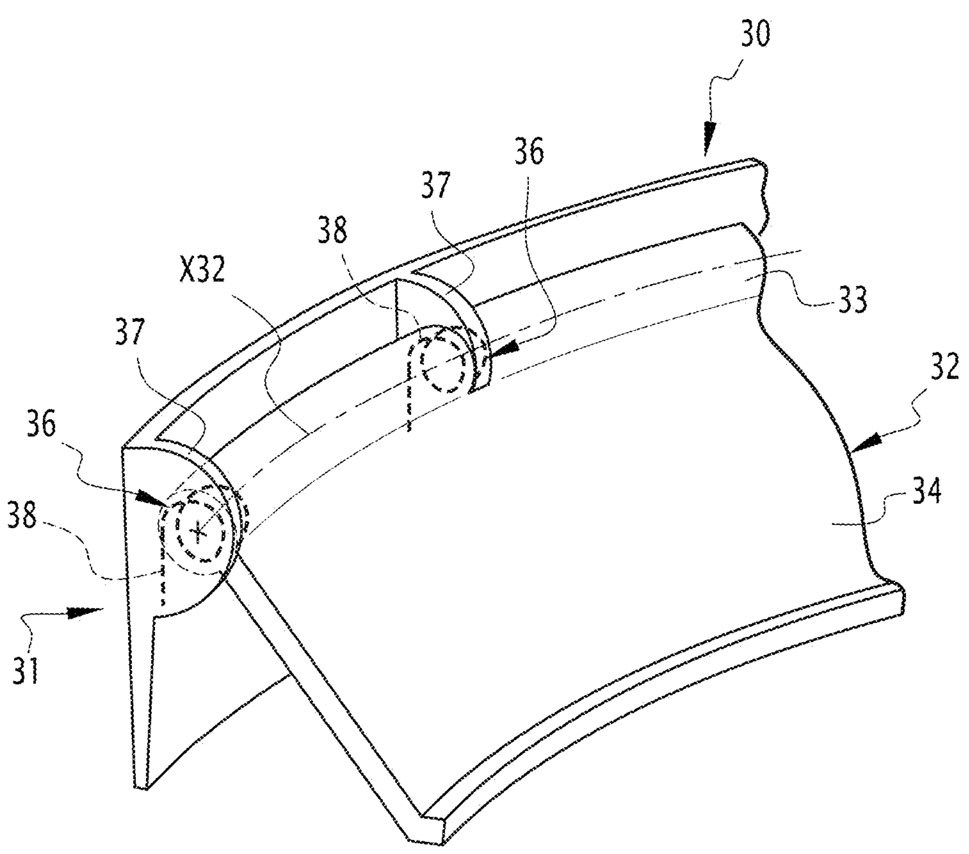
FIG. 3 is a schematic perspective view of a portion of the sealing device of FIG. 2, shown alone.

As can be seen in FIGS. 2 and 3, the sealing device 30 has a bracket 31. The bracket 31 is attached to the cab front panel 22 by any suitable means. Here, the bracket 31 is attached to the lower edge 23 of the front cabin panel 22, and can be attached to the inside face of this edge 23.

The sealing device 30 also includes a flap 32, which is mounted on the bracket 31 by extending from the bracket 31 towards the chassis front panel 12 across the gap G. The flap 32 thus includes a first end portion 33, which is turned towards the cab front panel 22 and which ensures the mounting of the flap 32 on the bracket 31, and a second end portion 34, which is opposite to the end portion 33 and which is turned towards the chassis front panel 12. The flap 32 is dimensioned so that its end portion 34 is in contact with the chassis front panel 12, in particular with the upper edge 13 thereof, when the truck 1 is driven on-road, as clearly visible in FIGS. 5 and 6. Thus, when the truck 1 is driven on-road, the flap 32 closes the gap G, isolating the portion of the gap G, located at the rear of the flap 32, from the exterior of the truck 1.

Here, as the sealing device 30 is arranged at the right front corner of the truck 1, the bracket 31 and the flap 32, in particular its end portions 33 and 34, are shaped curved along the angled profile of the corner panels formed by the cab front panel 22 and the chassis front panel 12, respectively.

The flap 32 is mounted on the bracket 31 in a tilting manner about a horizontal geometric axis X32. The geometric axis X32 may thus be curved along the angled profile of the corner panel formed by the cabin front panel 22. To this end, in the example illustrated in the figures and as more particularly visible in FIG. 4, the end portion 33 of the flap 32 cooperates in a form-fitting manner with a flange 35 of the bracket 31 to guide the flap in tilting about the geometric axis X32. Here, the end part 33 is convex while the flange 35 is concave, it being understood that the opposite or other geometries are possible as long as the respective complementary shapes of the end part 33 and the flange 35, which cooperate with each other to guide the flap in tilting, are centered on the geometric axis X32. Furthermore, the end portion 33 and the flange 35 may also cooperate in a form-fitting manner to retain the flap 32 horizontally with respect to the bracket 31, thereby stabilizing the mounting of the flap 32 on the bracket 31.

As shown schematically in FIG. 3, the device 30 also includes one or more resilient members 36, which are mounted on the bracket 31 and which act on the flap 32 to control the tilting of this flap relative to the bracket. Here, several resilient members 36 are provided and are regularly distributed on the bracket 31. Each resilient member 36 is integrated in a dedicated area 37 of the bracket 31, where the tilting mounting of the flap 32, in particular of the end portion 33 thereof, on the bracket 31 is implemented. According to a practical and efficient implementation form, each resilient member 36 may comprise a torsion spring 38, the opposite ends of which act respectively on the bracket 31 and on the flap 32, this torsion spring 38 possibly being substantially centered on the geometric axis X32.

Whatever the implementation form of the resilient members 36, they are designed to, when the truck 1 is driven on-road, maintain the flap 32, in particular its end portion 34, in contact with the chassis front panel 12, in particular with the upper edge 13 of the latter, by means of the adjustment in position of the flap 32 by tilting about the geometric axis X32. More generally, the sealing device 30 is designed, by any suitable means, to perform this function of maintaining the flap 32 in contact with the chassis front panel 12. To this end, the flap 32 and/or the chassis front panel 12 may be designed to make sliding the cooperating contact between the end portion 34 of the flap 32 and the upper edge 13 of the chassis front panel 12.

Taking into account the explanations given so far, it is understood that, when the truck 1 is driven on-road, as in particular in FIGS. 5 and 6, the sealing device 30 keeps the gap G closed despite the variations of the relative positioning between the chassis front panel 12 and the cab front panel 22, due to the reliefs of the road and their effect on the suspension between the driving cab 20 and the chassis 10. The aerodynamic and cleanliness performance of the truck 1 is thus remarkable, since, as the gap G is kept closed, this gap G is neither the cause of airflow restraint at the front of the truck 1, nor the place of soiling accumulation.

When the truck 1 is not in use, the presence of the sealing device 30 is not disturbing. In this regard, the bracket 31 may include a stopper 39. This stopper 39 does not interfere with the flap 32 when the truck 1 is driven on-road, as illustrated in FIGS. 5 and 6. When the truck 1 is not in use, the stopper 39 forms an abutment against which the flap 32 is maintained downward, as for example in FIG. 4. In particular, the flap 32 is thus maintained in abutment downwardly against the stopper 39 when the driving cab 20 is in the nominal vertical position, shown in FIG. 4, as well as when the driving cab 20 is in its tilted position. It will be noted that, in the nominal vertical position shown in FIG. 4, the stopper 39 positions the flap 32 so that the flap 32 is not in contact with the chassis front panel 12, whereby the end portion 34 of the flap 32 may be spaced from the upper edge 13 of the chassis front panel 12: this implies that the gap G is then not completely closed, which is not detrimental since the truck 1 is then not in use, and which may on the contrary facilitate the tilting of the driving cab 20 from its non-tilted position to its tilted position, by avoiding any interference between the sealing device 30 and the chassis 10 when tilting the driving cab 20 between its non-tilted and tilted positions.

According to another, not shown example including an optional arrangement, each or at least one of the resilient members 36 may include a gear for controlling the action of the corresponding resilient member, in particular being able to act on the deployment of the corresponding torsion spring 38.

Other variants are also conceivable, in particular by combining all or part of the examples described so far.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A vehicle, comprising:

a chassis, which at the front of the vehicle comprises at least one chassis front panel;

a driving cab, which is arranged at the front of the vehicle and which is mounted on the chassis by a suspension allowing the driving cab to move at least vertically relative to the chassis when the vehicle is driven on-road, the driving cab comprising, for the chassis front panel, a cab front panel which is disposed above and in vertical alignment with the chassis front panel, while being separated from the chassis front panel by a gap permitting relative movement between the chassis front panel and the cab front panel at least vertically; and for the gap, a sealing device for closing the gap, the sealing device comprising:

a bracket which is attached to the corresponding cab front panel; and a flap, which is tiltably mounted on the bracket and which extends from the bracket towards the corresponding chassis front panel across the gap, the sealing device being adapted to maintain the flap in contact with the corresponding chassis front panel;

wherein for the sealing device, the flap includes;

a first end portion, which is turned towards the corresponding cab front panel and cooperates in a form-fitting manner with a flange of the bracket to guide the flap in tilting relative to the bracket; and a second end portion, which is opposite to the first end portion and which is adapted to cooperate by sliding contact with the corresponding chassis front panel when the vehicle is driven on-road.

2. The vehicle of claim 1, wherein the sealing device comprises at least one resilient member, which is mounted on the bracket and which acts on the flap so as, by tilting the flap relative to the bracket, to maintain the flap in contact with the corresponding chassis front panel.

3. The vehicle of claim 2, wherein the at least one resilient member comprises a torsion spring.

4. The vehicle of claim 2, wherein a plurality of resilient members are provided and are regularly distributed on the bracket.

5. The vehicle of claim 1, wherein the driving cab is mounted on the chassis tiltably between a non-tilted position, in which the vehicle is drivable on-road, and a tilted position, in which the vehicle is not in use; and wherein the sealing device is designed not to interfere with the chassis when the driving cab is tilted between the non-tilted and tilted positions.

6. The vehicle of claim 5, wherein for the sealing device, the bracket includes a stopper, which does not interfere with the flap when the vehicle is driven on-road, but against which the flap is maintained in abutment downwardly when the driving cab is tilted between the non-tilted and tilted positions.

7. The vehicle of claim 1, wherein for the sealing device, the first end portion of the flap cooperates in a form-fitting manner with the flange of the bracket to also retain the flap horizontally relative to the bracket.

8. The vehicle of claim 1, wherein for the sealing device:

the corresponding gap is arranged at one of the front corners, respectively left and right, of the vehicle;

the corresponding chassis front panel and cab front panel are respectively corner panels; and the bracket and the flap are shaped curved along an angled profile of the corner panels.

9. The vehicle of claim 1, wherein two sealing devices are provided and are respectively arranged at the two front corners, respectively left and right, of the vehicle.

* * * * *